United States Patent [19]

Corder et al.

[11] Patent Number: 5,790,897
[45] Date of Patent: Aug. 4, 1998

[54] PLUG-IN COMPUTER CARD WITH INTERNAL AUDIO SPEAKER ELEMENT

[75] Inventors: Rodney Corder, Huntington Beach; Davin Stockwell, Irvine, both of Calif.

[73] Assignee: New Media Corp., Irvine, Calif.

[21] Appl. No.: 517,364

[22] Filed: Aug. 21, 1995

[51] Int. Cl.[6] .................................................. G06F 13/00
[52] U.S. Cl. ......................... 395/892; 395/821; 395/828; 364/708.1; 361/679
[58] Field of Search ...................... 381/87, 88, 89, 381/90, 81; 395/822, 882, 889, 299, 306, 293, 893, 821, 828, 892; 364/514 R, 708.1; 361/679

[56] References Cited

U.S. PATENT DOCUMENTS

| | | | |
|---|---|---|---|
| 4,550,429 | 10/1985 | Burbank et al. | 381/90 |
| 5,161,198 | 11/1992 | Noble | 381/81 |
| 5,323,291 | 6/1994 | Boyle et al. | 361/683 |
| 5,394,445 | 2/1995 | Bell et al. | 379/67 |
| 5,396,602 | 3/1995 | Amini et al. | 395/293 |
| 5,402,107 | 3/1995 | Rencavage | 340/573 |
| 5,450,551 | 9/1995 | Amini et al. | 395/299 |
| 5,481,616 | 1/1996 | Freadman | 381/90 |
| 5,502,463 | 3/1996 | Sasaki et al. | 345/204 |
| 5,511,001 | 4/1996 | Ichihara et al. | 364/514 R |
| 5,522,050 | 5/1996 | Amini et al. | 395/306 |
| 5,522,089 | 5/1996 | Kikinis et al. | 395/893 |

OTHER PUBLICATIONS

Markus, "Modern Electronic Circuits Reference Manual", McGraw-Hill Book Company, p. 999, 1980.
"HP adds high-end models to the Pavilion family of consumer PCs; new models offer advanced processors, multimedia & communications power for consumers", EDGE Publishing, Work-Group Computing Report, 1995, vol. 6, n280, p. 14.

*Primary Examiner*—Thomas C. Lee
*Assistant Examiner*—Ki S. Kim
*Attorney, Agent, or Firm*—Gregory Garmong

[57] ABSTRACT

A plug-in computer card includes an audio generator circuit having an audio analog output and an enclosure around the audio generator circuit. An audio speaker element is contained within the enclosure, and is in electrical communication with the audio analog output of the audio generator circuit. The audio speaker element is preferably a piezoelectric element fixed to a cover of the enclosure or a loudspeaker mounted within the enclosure. There is an input/output connector fixed to the enclosure and in electrical communication with the audio generator circuit. The card is also provided with a disabling circuit that electronically disables the audio speaker element responsive to an electronic signal.

18 Claims, 2 Drawing Sheets

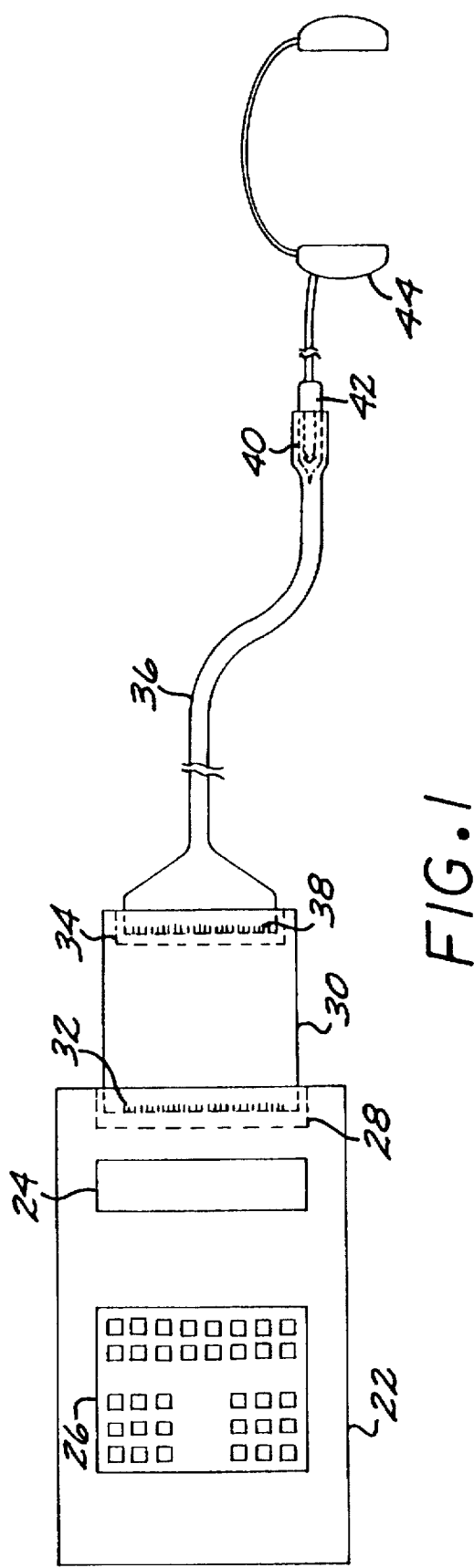
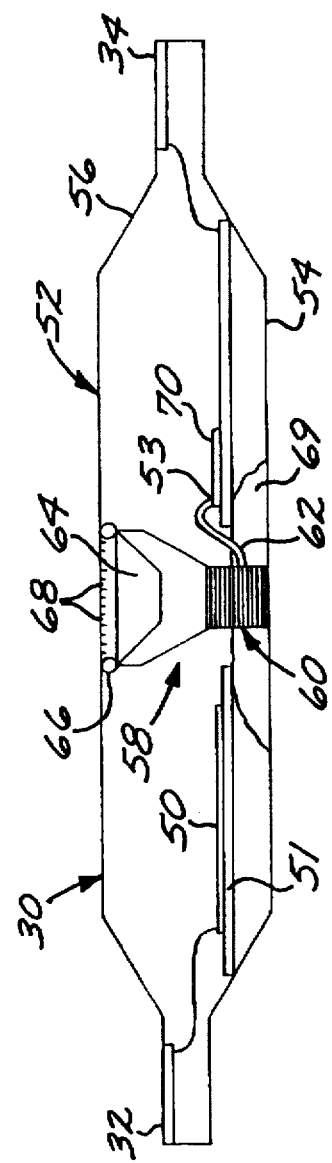
FIG. 1
FIG. 2

PLUG-IN COMPUTER CARD WITH INTERNAL AUDIO SPEAKER ELEMENT

BACKGROUND OF THE INVENTION

This invention relates to computer systems, and, more particularly, to a plug-in computer card having an audio speaker element enclosed within the card.

Polyphonic audio output signals are an effective way for communicating some types of information from a computer to a user. Such polyphonic audio output signals can convey voice, music, or sound effects in both technical applications and recreational activities such as computer games. The use of polyphonic audio output signals has been known for some time for use with mainframe and desktop computers. It has also been known for specialized, dedicated-purpose, hand-held computers such as those used to play computer games. As the terms are used in the art, polyphonic output signals are distinct from digitally driven, single-tonal or discrete multi-tonal output signals of the "beep" type that are built in to some computers to signal the operator regarding aspects of computer operation. The polyphonic audio output signals are typically driven by analog (rather than digital) electrical signals to obtain a good frequency response that permits the production of synthesized speech, music, or sound effect outputs.

Another class of computers is general-purpose, hand-held (sometimes termed "palm-top) computers such as those used in business and technical applications where portability and light weight are most important. Such computers have severe power-use limitations and space limitations within the housing of the computer, because the processor, memory, power supply, display, keyboard, external connectors and other necessary functions must be provided within a small volume. Polyphonic audio output devices, being optional and suited for special-purpose applications, have not been provided within such general-purpose hand-held computers.

There is an interest in making polyphonic audio output available for use with existing and future palm-top computers and compact notebook computers for selected applications, but not as a permanent part of such computers which would preclude other functions because of the small size of the computers. In one such approach now available, external speakers or headphones are connected through a connector cable to the computer. While operable and useful in many situations, this approach has the drawback in other situations that the user must make the external apparatus available for use when needed.

There is therefore a need for a temporary, plug-in capability to generate polyphonic audio output from a hand-held computer, without using external apparatus such as speakers or headphones. The present invention fulfills this need, and further provides related advantages.

SUMMARY OF THE INVENTION

The present invention provides a plug-in computer card with an audio internal speaker element that produces good-quality, polyphonic audio output. The card is structured so that the audio output volume is maximized for minimal power consumption and minimal size, an important consideration for hand-held computers. The computer card carries both the sound-generating circuitry and the audio output speaker element within a single convenient package that is rugged yet easily carried and used.

In accordance with the invention, a plug-in computer card comprises an audio generator circuit having an audio analog output, an enclosure around the audio generator circuit, an audio speaker element contained within the enclosure and in electrical communication with the audio analog output of the audio generator circuit, and an input/output connector fixed to the enclosure and in electrical communication with the audio generator circuit.

In one preferred form of the invention, the audio speaker element includes a loudspeaker having a pair of drive leads in electrical communication with the audio analog output of the audio generator circuit. The loudspeaker is preferably mounted to the inside of the cover of the enclosure. The enclosure is provided with one or more openings therethrough opposite a speaker cone of the loudspeaker. In this embodiment, the enclosure acts as a resonating housing to prevent leakage of the sound energy and to direct the sound energy outwardly through the openings.

In another embodiment, the audio speaker element includes a piezoelectric element fixed to an interior wall, preferably the interior of the cover, of the enclosure. The piezoelectric element has a drive lead in electrical communication with the audio analog output of the audio generator circuit. In this embodiment, the enclosure acts as an extension of the piezoelectric element, and thus is an active part of the audio output device.

In these embodiments, the enclosure on the card plays an important role in obtaining a maximum sound output and also in ensuring good quality sound output. By contrast, a separately mounted audio speaker element having no enclosure produces substantially less sound output and lower quality of the sound output, and leads to a less-compact and rugged structure, and is not practical for plug-in applications.

The card also includes disabling circuit means for electronically disabling the audio speaker element. It is desirable to have the capability to disable the audio speaker element under software control from the computer via a command transmitted through the external connector. It is also desirable to have the capability to disable the audio speaker element that is within the card when a jack plug of an external speaker element such as an external speaker or a headphone is plugged into an external jack receptacle. Because the jack plug and receptacle are electronically remote in the architecture of the hand-held computer and may not always be present, the disabling circuit must be operable electronically rather than mechanically. The disabling is most readily accomplished for the internal loudspeaker embodiment by controllably disabling its amplifier. In the case of the piezoelectric element, the disabling is preferably performed by opening a switch in series with the drive lead of the piezoelectric element.

The present invention provides an advance in the art of hand-held and small notebook computers. A plug-in card external to the computer provides audio generation circuitry and an audio speaker element. The audio speaker element is internal to the enclosure of the plug-in card, to protect it during handling and to ensure a maximum volume of good-quality sound with minimal power consumption. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIG. 1 is a schematic view of a hand-held computer, a plug-in audio computer card according to the invention, a dongle, and an external speaker element;

3

Figure 3:
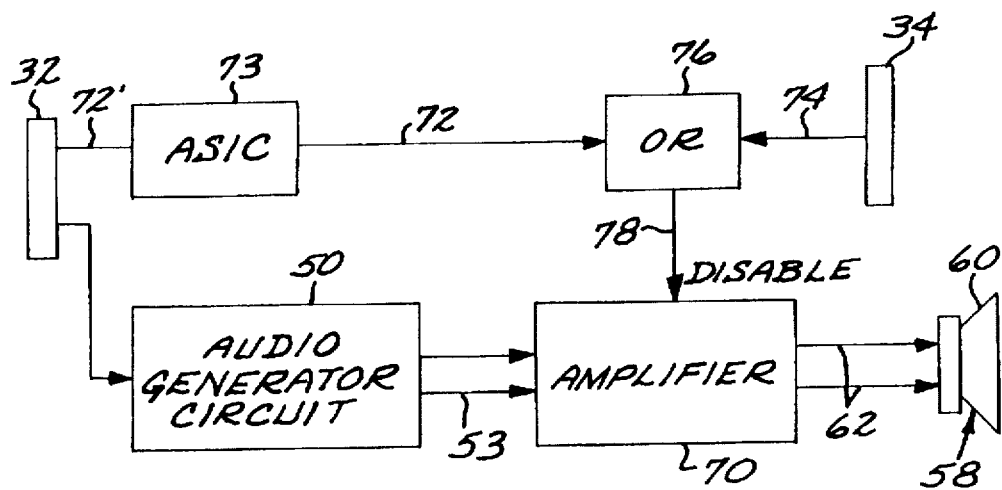
Figure 4:
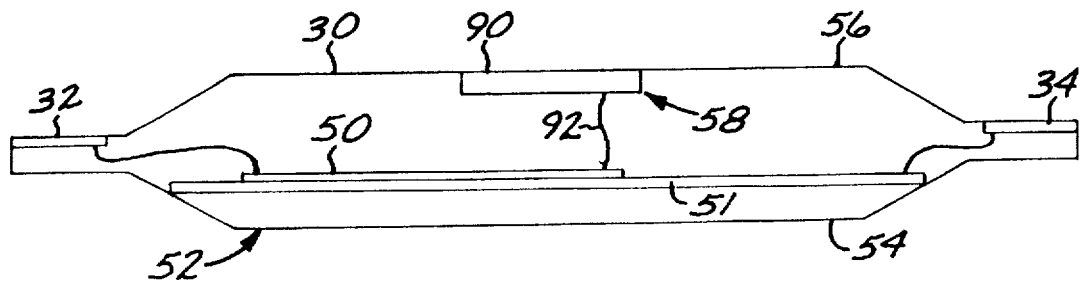
Figure 5:
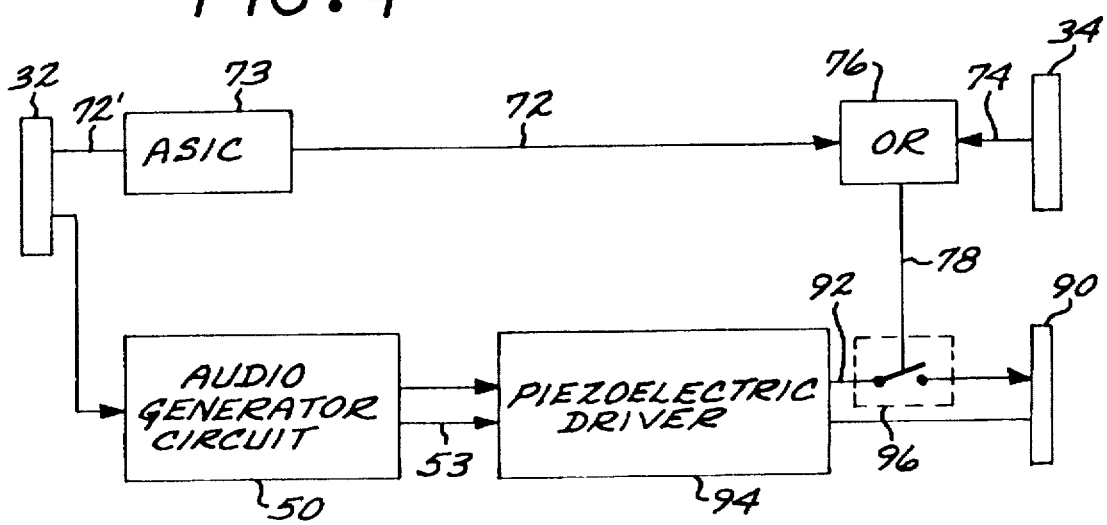

FIG. 2 is a schematic side sectional view of one embodiment of the plug-in card using an internal loudspeaker;

FIG. 3 is a circuit diagram of a disabling circuit for use with the plug-in card of FIG. 2;

FIG. 4 is a schematic side sectional view of a second embodiment of the plug-in card using an internal piezoelectric element; and FIG. 5 is a circuit diagram of a disabling circuit for use with the plug-in card of FIG. 4.

DETAILED DESCRIPTION OF THE PREFERRED EMBODIMENTS

FIG. 1 depicts a computer system 20 in which the present invention is used. A hand-held computer 22 includes an externally visible display 24 and keypad 26, as well as an internal central processing unit. Hand-held computers 22 suitable for use with the present invention are well known and available commercially. An example of such a computer is the Hewlett Packard HP200LX hand-held computer. The hand-held computer 22 also has a built-in connector 28 for external access by an external plug-in card 30, which has a mating first input/output connector 32 at one end of the card 30. At its other end, the plug-in card 30 has a second input/output connector 34 into which is plugged a cable termed a dongle 36. The dongle 36 has a mating connector 38 for the second connector 34 at one end, and a connector including a jack receptacle 40 at the other end. A jack plug 42 of an external speaker 44, here shown as a pair of headphones, can be plugged into the jack receptacle 40.

The plug-in card 30 is externally plugged into the computer 22, rather than into internal connectors. It may be added to or removed from the system without opening the housing of the computer 22, and differs in this respect from conventional internal plug-in cards. The external plug-in card 30 must physically protect the components and circuit elements mounted on the card, because the card is typically exposed to rougher handling during use and also exposed to the elements. The external plug-in card 30 therefore must include a hardened structure around the components and circuit elements of the card. This protective structure distinguishes the external plug-in card 30 from internal plug-in cards found inside desk-top computers, for example, which are not similarly protected for cost and heat-dissipation reasons, and poses difficulties in the design of the structure of the plug-in card 30.

FIG. 2 shows the physical arrangement of a first embodiment of the plug-in card 30, which is preferably a PCMCIA (Personal Computer Memory Card International Association)-format card or a small PCI (Peripheral Component Interface)-format card, and FIG. 3 depicts the electronic circuitry. The plug-in card 30 includes an audio generator circuit 50, which is mounted on a printed circuit board 51 that is received within an enclosure 52. Board-mounted audio generator circuits are well known in the art and are widely available commercially. An operable audio generator circuit 50 is available commercially from ESS Technology, Inc. as the model ESS488, and is described in the ESS488 Audio Drive Data Sheet. The present invention is not limited to this particular form of the circuit 50, and can be used with any operable audio generator circuit 50. In general, such an audio generator circuit 50 is operated under control of the central processing unit of the computer 22, through an interconnection at the first connector 32. It has an analog audio output 53 extending to a speaker driver and amplifier 70.

The enclosure 52 has a base 54 and a cover 56, which is open during manufacturing and then sealed to the base after

4 the interior components are respectively assembled to the cover 56 and to the base 54. The enclosure is preferably made of stainless steel. The first connector 32 is mounted at one end of the enclosure 52, and the second connector 34 is mounted at the opposite end of the enclosure 52. The first connector 32 is preferably a PCMCIA 68-pin connector that is the current standard for hand-held computer interfaces and connectors, or a small PCI 108 pin connector.

An internal audio speaker element 58 is mounted within the enclosure 52. The audio speaker element 58 includes a loudspeaker 60 having a pair of drive leads 62 extending from the loudspeaker 60 to the amplifier 70. The loudspeaker 60 must be sufficiently small to fit within the size constraints of the card 30, which in its preferred form has a thickness of about 0.2 inches. The preferred loudspeaker 60 is the RDI Electronics HSP-23S loudspeaker, which has a diameter of about 0.9 inches and an overall thickness of about 0.2 inches. The loudspeaker 60 is preferably mounted to the interior of the cover 56 of the enclosure 52, with its speaker cone 64 pointing toward the cover 56. To accommodate the preferred HSP-23S loudspeaker, an opening is cut in the printed circuit board 51 that supports the audio generator circuit 50.

The audio speaker element 58 is affixed to the enclosure 52 in an appropriate manner that permits its operation. Acceptable approaches include fixing the loudspeaker to the enclosure, as with an adhesive, for example. In the illustrated embodiment, the periphery of the speaker cone 64 is adhesively sealed along a bead 66 to the inside of the cover 56 of the enclosure 52. The bead 66 of adhesive is carefully placed along the periphery of the speaker cone 64 so that it does not interfere with the sound-producing vibrations of the interior of the speaker cone. In this approach, the loudspeaker 60 is bonded to the interior of the cover 56, and floats within the enclosure 52. Optionally, a shock-absorbing element such as a piece of foam 69 can be placed adjacent to the floating portion of the loudspeaker 60 to cushion vibrations that otherwise might debond the adhesive bead 66. The cover 56 preferably has at least one, and most preferably several, openings 68 therethrough opposite the speaker cone 64 so that sound generated by the loudspeaker 60 is directed out of the interior of the enclosure 52.

In this embodiment, the enclosure 52 acts as a speaker enclosure for the loudspeaker 60. The enclosure 52 serves several important functions in regard to the loudspeaker 60. The enclosure serves as a mounting support. The enclosure protects the loudspeaker against damage. Acoustically, the enclosure 52 prevents leakage of the sound energy around the loudspeaker 60 and directs the sound energy outwardly through the openings 68. The result is improved sound volume and quality of the loudspeaker 60, as compared with a loudspeaker which is not enclosed within an enclosure 52.

Loudspeakers 60 such as the preferred HSP-23S model cannot be driven directly by the analog output 53 of the audio generator circuit 50 with sufficient volume to be useful. Instead and as shown in FIG. 3, the output 53 of the circuit 50 is first amplified by the speaker driver and amplifier 70, whose output is provided to the loudspeaker 60 through the drive leads 62. The amplifier 70 is mounted to the printed circuit board 51 within the enclosure 52. A preferred amplifier for use with the HSP-23S loudspeaker is a Motorola MC34119 amplifier.

One important capability for use with the internal audio speaker element 58 is a muting feature, to prevent sound from being generated by the loudspeaker 60 under selected conditions. This muting feature is desirably enabled by a digital signal generated in either of two ways. One is under software control from the computer 22. The other is by the act of plugging the jack plug 42 of the external speaker 44 into the jack receptacle 40. Muting in the latter circumstance is desired so that sound output from the plug-in card 30 is not confused with that of the external speaker 44, and so that there is not excess power consumption by the amplifier 70. That is, whenever the external speaker 44 is plugged into the system, it is presumed that the user wishes the sound to emanate from the external speaker 44 rather than the internal audio speaker element 58.

A digital muting signal 72 is generated by a register in an interface ASIC 73 on the card 30. The state of the register is controlled by a signal 72' generated by the computer 22 and provided to the card 30 and the ASIC 73 through the first connector 32. A plug-in digital muting signal 74 is provided to the card 30 through the second connector 34 from the jack receptacle 40 and jack plug 42. The jack receptacle 40 generates a digital signal when the jack plug 42 is plugged in, and another digital signal when the jack plug 42 is unplugged.

An operable and preferred jack plug and jack receptacle unit of this type is the LZR Electronics model SJ400 stereo jack receptacle and jack plug with a 2-pole, 2-throw switch therein. This type of jack receptacle and jack plug, which generates a digital output signal, is to be contrasted with jack receptacles and jack plugs that operate with a mechanical switch to cut out an internal circuit when the jack plug is plugged in. In jack units utilizing a mechanical switch, the incoming signal is connected to connector pins in the jack receptacle that lead to an internal speaker, when the jack plug is not inserted into the jack receptacle. When a jack plug is inserted into the jack receptacle, the contacts to the internal speaker are mechanically opened and the audio signal feeds exclusively to the jack plug, disabling the internal speaker. In the present case, the jack receptacle and jack plug are typically provided in the dongle 36, which may be unplugged at connector 34/38 and not a part of the system. In that case, the conventional mechanical arrangement is not operable, and an electronic signal is required as an indicator both that the jack receptacle is part of the system, and that the jack plug has been inserted into the jack receptacle. If the dongle 36 is not connected at connector 34/38, the internal audio speaker element cannot be muted by any signal 74, but it can still be muted under control of the computer through the signal 72.

The digital muting signals 72 and 74 are provided to a logical OR device 76 whose digital output 78 is high if either of the signals 72 and 74 is active. The output 78 is connected to a chip (amplifier) disable input of the amplifier 70, which is a feature of the preferred Motorola MC34119 amplifier 70. An advantage of this approach is that the output is muted, and simultaneously the amplifier 70 is placed into a state of low power consumption that does not drain the power source of the computer 22. If the amplifier does not have a chip disable, a digitally driven switch in the lines 53 or the lines 62 can be used instead to mute the loudspeaker 70.

FIGS. 4 and 5 illustrate a second preferred embodiment of the invention, wherein the audio speaker element is a piezoelectric element. Many of the components and structures described in relation to the embodiment of FIGS. 2 and 3 are also found in this embodiment. The same reference numbers are used in FIGS. 4 and 5, and the discussion of these features is incorporated here and will not be repeated.

In the embodiment of FIGS. 4 and 5, the audio speaker element 58 comprises a piezoelectric element 90, which is preferably mounted to the inside of the cover 56 of the enclosure 52. The piezoelectric element generates vibrations responsive to an electrical driving signal supplied through a drive lead 92. Piezoelectric elements are known in the art and are available commercially. A preferred piezoelectric element 90 is the MuRata Erie Model 7BB-35-3A0, which has a diameter of 35 millimeters and a thickness of 0.54 millimeters. The piezoelectric element 90 is mounted to the inside of the cover 56, preferably using a double-sided adhesive such as 0.002 inch thick 3M model 367 double-sided acrylic tape adhesive or an epoxy-based adhesive. The 3M model 367 acrylic tape adhesive is preferred, inasmuch as it remains flexible over an extended period of time.

When the piezoelectric element 90 is mounted to the inside of the cover of the enclosure 52 in this way, the cover 56 performs acoustically as an extension of the piezoelectric crystal in the element 90. That is, the cover 56 vibrates in the manner of a diaphragm as an active part of the audio output device. The effective area of the speaker is thereby greatly increased. The base 54 acts in the manner of a speaker enclosure to aid in directing the sound outwardly from the piezoelectric element 90 and cover 56.

The preferred piezoelectric element 90 is driven to full amplitude by a 4 volt RMS signal. The 5-volt signal available from the computer 22 through the PCMCIA interface at the connector 32 is therefore suited for driving the piezoelectric element 90. An amplifier is not required, and a piezoelectric driver 94 in the form of an operational amplifier is sufficient between the output 53 of the audio generator circuit 50 and the piezoelectric element 90 to provide the driving signal for the piezoelectric element 90.

To provide for the same type of muting function as described previously, a switch 96 is placed in the drive lead 92. The switch 96 is preferably an N-FET such as a Siliconix ZN7002 whose digital input is the output of the logical OR 76. The other aspects of the muting function and the jack receptacle and jack plug are as described previously.

The present invention provides a plug-in computer card that provides good-quality, polyphonic sound output in a highly efficient manner. That is, the sound volume is high for a small size of the plug-in card and a small power consumption, an important consideration for computers such as palm-top and small notebook computers that are battery powered. Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A plug-in computer card, comprising:
   an audio generator circuit having an audio analog output;
   an enclosure around the audio generator circuit;
   an audio speaker element contained within the enclosure and in electrical communication with the audio analog output of the audio generator circuit; and
   an input/output connector fixed to the enclosure and in electrical communication with an input of the audio generator circuit.

2. The plug-in computer card of claim 1, wherein the audio speaker element comprises:
   a piezoelectric element fixed to an interior wall of the enclosure, the piezoelectric element having a drive lead in electrical communication with the audio analog output of the audio generator circuit.

3. The plug-in computer card of claim 1, wherein the audio speaker element comprises:

a loudspeaker having a pair of drive leads in electrical communication with the audio analog output of the audio generator circuit.

4. The plug-in computer card of claim 3, wherein the enclosure comprises at least one opening therethrough disposed opposite a speaker cone of the loudspeaker.

5. The plug-in computer card of claim 1, wherein the connector is a PCMCIA connector.

6. The plug-in computer card of claim 1, wherein the connector is a small PCI connector.

7. The plug-in computer card of claim 1, further including disabling circuit means for electronically disabling the audio speaker element responsive to a signal communicated through the connector.

8. The plug-in computer card of claim 1, further including disabling circuit means for electronically disabling the audio speaker element responsive to a digital muting signal communicated through the connector independently of a signal communicated to the audio generator circuit.

9. A plug-in computer card, comprising:

an enclosure having a base and a cover;

an audio generator circuit within the enclosure, the audio generator circuit having an audio analog output;

a piezoelectric element fixed to an interior wall of the cover of the enclosure, the piezoelectric element having a drive leads in electrical communication with the audio analog output of the audio generator circuit; and an input/output connector fixed to the enclosure and in electrical communication with an input of the audio generator circuit.

10. The plug-in computer card of claim 9, wherein the connector is a PCMCIA connector.

11. The plug-in computer card of claim 9, wherein the connector is a small PCI connector.

12. The plug-in computer card of claim 9, further including disabling circuit means for electronically disabling the audio speaker element responsive to a disabling signal.

13. The plug-in computer card of claim 9, further including a switch in the drive lead of the piezoelectric element; and means for opening the switch responsive to either a software command or a connection to an external speaker.

14. A plug-in computer card, comprising:

an enclosure having a base and a cover;

an audio generator circuit within the enclosure, the audio generator circuit having an audio analog output;

a loudspeaker amplifier within the enclosure, the loudspeaker amplifier having an input in electrical communication with the audio analog output and further having an output;

a loudspeaker having a pair of drive leads in electrical communication with the output of the loudspeaker amplifier, the loudspeaker being mounted to the enclosure and having a speaker cone, the enclosure having at least one opening therethrough disposed opposite the speaker cone of the loudspeaker; and an input/output connector fixed to the enclosure and in electrical communication with the audio generator circuit.

15. The plug-in computer card of claim 14, wherein the connector is a PCMCIA connector.

16. The plug-in computer card of claim 14, wherein the connector is a small PCI connector.

17. The plug-in computer card of claim 14, further including disabling circuit means for electronically disabling the loudspeaker.

18. The plug-in computer card of claim 14, further including a switch between the audio generator circuit and the loudspeaker; and means for opening the switch responsive to either a software command or a connection to an external speaker.

* * * * *